(12) United States Patent
Kunisawa et al.

(10) Patent No.: US 7,165,585 B2
(45) Date of Patent: Jan. 23, 2007

(54) RUBBER COMPOSITION FOR TIRE AND PNEUMATIC TIRE USING THE SAME

(75) Inventors: Tetsuya Kunisawa, Kobe (JP); Naohiko Kikuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 296 days.

(21) Appl. No.: 10/811,909

(22) Filed: Mar. 30, 2004

(65) Prior Publication Data

US 2004/0209988 A1    Oct. 21, 2004

(30) Foreign Application Priority Data

Apr. 18, 2003 (JP) .............................. 2003-114540

(51) Int. Cl.
*B60C 5/00* (2006.01)
(52) U.S. Cl. ..................................... 152/450; 524/528
(58) Field of Classification Search ................ 524/528; 152/450

See application file for complete search history.

(56) References Cited

U.S. PATENT DOCUMENTS 3,842,883 A * 10/1974 Masson et al. .......... 152/209.5
6,300,396 B1  10/2001 Tsunoda et al.

FOREIGN PATENT DOCUMENTS

| EP | 0 754 571 A1 | 1/1997 |
|---|---|---|
| EP | 1 342 751 A1 | 9/2003 |
| GB | 876395 A | 8/1961 |
| JP | 3-21801 A | 1/1991 |
| JP | 9-40809 A | 2/1997 |
| JP | 9-241433 A | 9/1997 |
| JP | 2001-233994 A | 8/2001 |
| WO | WO 96/00259 A | 1/1996 |

OTHER PUBLICATIONS

Patent Abstracts of Japan, 0101 (48) (C-350), May 29, 1986 & JP 61 007343 A (Mitsui Sekiyu Kagaku Kogyo KK), Jan. 14, 1986 (abstract).
Patent Abstracts of Japan, 0100 (67) (C-333), Mar. 15, 1986 & JP 60 208335 A (Touritsu Kogyo: KK), Oct. 19, 1985 (abstract).
Patent Abstracts of Japan, 0133 (67) (C-626), Aug. 15, 1989 & JP 1 123837 A (Bridgestone Corp.), May 16, 1989 (abstract).

* cited by examiner

*Primary Examiner*—Peter D. Mulcahy
(74) *Attorney, Agent, or Firm*—Birch, Stewart, Kolasch and Birch, LLP

(57) ABSTRACT

The present invention aims to provide a lightweight tire without decreasing durability and to reduce rolling resistance and improve steering stability of the tire. Specifically, the present invention relates to a rubber composition for a tire comprising 20 to 120 parts by weight of an inorganic filler, and 5 to 70 parts by weight of polyethylene powder, based on 100 parts by weight of diene rubber, the tire being prepared by kneading at 140° C. at most. The particle size of the polyethylene powder is preferably at most 500 μm.

10 Claims, No Drawings they are hereby incorporated by reference.
RUBBER COMPOSITION FOR TIRE AND PNEUMATIC TIRE USING THE SAME This Nonprovisional application claims priority under 35 U.S.C. § 119(a) on Patent Application No(s). 2003-114540 filed in Japan on Apr. 18, 2003, the entire contents of which are hereby incorporated by reference.

BACKGROUND OF THE INVENTION

The present invention relates to a rubber composition for an automobile tire and a pneumatic tire using the same.

In order to reduce rolling resistance of a tire, a tire can be made lightweight. The conventional method for obtaining a lightweight tire is the method of reducing the amount of rubber that forms the tire. However, durability of a tire is decreased by this method. Because a small amount of rubber is used, stiffness of the tire and steering stability tend to decrease. Also, when the amount of the filler in a rubber composition is reduced, rolling resistance can be reduced but reinforcement properties of the rubber decrease.

It is conventionally known that wet skid performance and braking performance are improved, when a polymer such as polyethylene is compounded to the rubber component (see JP-A-2001-233994, Japanese Patent No. 3021801, JP-A-9-40809). Also, destruction resistance of the rubber can be improved and low heat generation can be obtained by adding polyethylene (see JP-A-9-241433).

However, in these methods, the kneading temperature of the rubber composition is high and exceeds the melting point of polyethylene. As a result, dispersion of the compounded polyethylene is insufficient. Consequently, steering stability is insufficient and a lightweight tire cannot be prepared. In addition, polyethylene powder is poor in adhesion with diene rubber and is known to easily become the destruction point.

SUMMARY OF THE INVENTION

The present invention aims to obtain a lightweight tire without decreasing durability and to reduce rolling resistance and improve steering stability of the tire.

That is, the present invention relates to a rubber composition for a tire comprising 20 to 120 parts by weight of an inorganic filler, and 5 to 70 parts by weight of polyethylene powder, based on 100 parts by weight of diene rubber; the tire being prepared by kneading at 140° C. at most.

The particle size of the polyethylene powder is at most 500 μm.

The present invention also relates to a pneumatic tire having a base tread comprising the rubber composition.

DETAILED DESCRIPTION

The rubber composition for a tire of the present invention contains diene rubber, an inorganic filler and polyethylene powder.

The rubber composition for a tire of the present invention contains diene rubber such as styrene-butadiene rubber (SBR), butadiene rubber (BR), isoprene rubber (IR), acrylonitrile butadiene rubber (NBR) and natural rubber (NR) as a rubber component.

The rubber composition for a tire of the present invention contains carbon black and/or silica as an inorganic filler. The kind of carbon black is not particularly limited and examples thereof are HAF, ISAF and SAF. Also, the kind of silica is not particularly limited and examples thereof are dry silica (silicic anhydride) and wet silica (precipitated silica). The amount of carbon black and/or silica as the inorganic filler is 20 to 120 parts by weight, preferably 30 to 100 parts by weight, more preferably 35 to 85 parts by weight, based on 100 parts by weight of diene rubber. When the amount of carbon black and/or silica is less than 20 parts by weight, reinforcement properties decrease significantly and when the amount is more than 120 parts by weight, rolling resistance becomes poor, thus being unfavorable.

The rubber composition for a tire of the present invention contains polyethylene (PE) powder. The PE powder can be powder obtained by drying after polymerization or by freezing and pulverizing the powder dried after polymerization and the process for preparing the PE powder is not particularly limited. The PE powder used in the present invention is powder having small particle size. The particle size of the PE powder is preferably at most 500 μm, more preferably 1 to 300 μm, further preferably 10 to 200 μm. When the particle size of the PE powder is more than 500 μm, the PE powder does not disperse in the rubber and remains as foreign material, decreasing durability, thus being unfavorable. Also, from the viewpoint of high melting point and hardness, PE powder having high crystallinity is preferable.

The amount of the PE powder is 5 to 70 parts by weight, preferably 5 to 60 parts by weight, more preferably 10 to 55 parts by weight, based on 100 parts by weight of diene rubber. When the amount of PE powder is less than 5 parts by weight, a lightweight tire and reduced rolling resistance cannot be achieved and steering stability cannot be improved. When the amount of PE powder is more than 70 parts by weight, the strength of the rubber decreases and cost becomes high, thus being unfavorable.

When mixing the PE powder with the diene rubber, the kneading temperature is at most 140° C., preferably 110 to 140° C. When kneading is conducted at a temperature higher than 140° C., the PE powder melts and phase conversion occurs. As a result, the rubber does not come together, thereby decreasing sheet processability. When kneading is conducted at a temperature lower than 110° C., kneading is often insufficient and the dispersion condition becomes poor, thus being unfavorable.

In the rubber composition for a tire of the present invention, process oil (such as paraffin process oil, naphthene process oil and aromatic process oil) can be compounded. The amount of the process oil is preferably 1 to 60 parts by weight, more preferably 1 to 30 parts by weight, based on 100 parts by weight of diene rubber. When the amount of process oil is less than 1 part by weight, processability tends to become poor and when the amount of process oil is more than 60 parts by weight, hardness of the rubber decreases and steering stability tends to become poor.

Furthermore, a silane coupling agent can be compounded together with silica in the rubber composition for a tire of the present invention. Also, besides the rubber component, inorganic filler and PE powder, compounding agents which are usually used in a rubber composition can be compounded accordingly, such as a wax, an antioxidant, stearic acid, zinc oxide, a process oil, a vulcanizing agent and a vulcanization accelerator.

The rubber composition for a tire of the present invention is obtained by kneading the rubber component, inorganic filler comprising carbon black and/or silica, PE powder and other compounding agents when necessary using the usual processing apparatus such as a roll, a banbury mixer and a kneader.

The tire of the present invention is prepared by the usual method using the rubber composition for a tire as the tire tread. That is, the rubber composition for a tire is extruded in the form of a tire tread before vulcanization and laminated by the usual method in a tire molding machine to form an unvulcanized tire. This unvulcanized tire is heated and pressurized in a vulcanizer to obtain a tire.

The rubber composition for a tire of the present invention can be applied as a rubber composition which forms the tire but is most preferably used for the base tread. When used for a cap tread, abrasion resistance tends to decrease, thus being unfavorable.

The present invention is explained in detail based on Examples below but not limited thereto.

EXAMPLES 1 to 3 AND COMPARATIVE EXAMPLES 1 to 3

The components other than sulfur and the vulcanization accelerator were kneaded using a 1.7 L banbury made by Kobe Steel, Ltd. at a maximum temperature of at most 140° C. Then, sulfur and the vulcanization accelerator were added to the obtained kneaded article and kneading was conducted with a twin-screw roller. The obtained mixture was vulcanized at 150° C. for 30 minutes to obtain a rubber composition for a tire. Each component used in Examples and Comparative Examples is shown in Table 1. The PE powder that was used was GUR AP 3746 available from Ticona Co., Ltd. having a particle size of 120 μm and a melting point of 142° C. In Examples and Comparative Examples, a tire was prepared using PE powder in the base tread, but the present invention is not limited thereto.

TABLE 1

| Component | |
|---|---|
| Diene Rubber | SBR1502 (available from JSR Corporation) |
| Carbon Black | N330 (available from Showa Cabot Co., Ltd.) |
| Process Oil | Diana Process Oil PS32 (available from Idemitsu Kosan Co., Ltd.) |
| Wax | SUNNOC WAX (available from Ouchi Shinko Chemical Industrial Co., Ltd.) |
| Antioxidant | SANTOFLEX 13 (available from FLEXSYS CO.) |
| Stearic Acid | KIRI (available from NOF Corporation) |
| Zinc Oxide | Zinc Oxide Type 2 (available from Mitsui Mining and Smelting Co., Ltd.) |
| PE Powder | GUR AP 3746 (available from Ticona Co., Ltd.) |
| Sulfur | Insoluble Sulfur (available from Nippon Kanryu Industry Co., Ltd.) |
| Vulcanization Accelerator | Nocceler NS (available from Ouchi Shinko Chemical Industrial Co., Ltd.) |

Measurement

Hardness (JIS-A)

Hardness of the prepared rubber composition for a tire was measured at 25° C. using a JIS-A hardness meter.

Viscoelasticity

Complex modulus (E*) and loss tangent (tanδ) at 60° C. were measured under a frequency of 10 Hz, initial strain of 10% and dynamic strain of 2% using VES-F-3 made by Iwamoto Corporation. The larger the E* value is the higher the stiffness and the more superior the steering stability. Less heat generation occurs the smaller tanδ value is.

Tensile Test

Tensile test of the prepared rubber composition for a tire was conducted according to JIS-K6251 using a type 3 dumbbell and tensile strength at break (TB) and elongation at break (EB) were measured. The larger the obtained number value is the more favorable the rubber strength.

Tear Propagation Test

Tear propagation test of the prepared rubber composition for a tire was conducted according to JIS-K6252. The larger the obtained number value is the more favorable the rubber strength.

Steering Stability

A 195/60R15 size tire was prepared by the usual method and sensory evaluation was conducted on a test course using a normal automobile to which the above tire was mounted. Particularly, with respect to handle response, evaluation was conducted relatively by assuming Comparative Example 1 to be 6. The higher the number the better the steering stability.

Lightweight Tire

The weight of the prepared tire was measured under windless conditions using a scale. With consideration to the margin of error, a tire of the same standard was weighed under conditions of N=at least 3 and the average value was assumed to be the tire weight. The value shown in Table 2 demonstrates the degree to which the tire was made lightweight compared to the standard tire.

TABLE 2

| | Ex. | | | Com. Ex. | | |
|---|---|---|---|---|---|---|
| | 1 | 2 | 3 | 1 | 2 | 3 |
| Composition (parts by weight) | | | | | | |
| Rubber Component (SBR) | 100 | 100 | 100 | 100 | 100 | 100 |
| Carbon Black | 85 | 55 | 20 | 90 | 87.5 | 15 |
| Process Oil | 15 | 15 | 15 | 15 | 15 | 15 |
| Wax | 2 | 2 | 2 | 2 | 2 | 2 |
| Antioxidant | 2 | 2 | 2 | 2 | 2 | 2 |
| Stearic Acid | 2 | 2 | 2 | 2 | 2 | 2 |
| Zinc Oxide | 2 | 2 | 2 | 2 | 2 | 2 |
| PE Powder | 5 | 35 | 70 | 0 | 2.5 | 75 |
| Sulfur | 2.5 | 2.5 | 2.5 | 2.5 | 2.5 | 2.5 |
| Vulcanization Accelerator | 1.5 | 1.5 | 1.5 | 1.5 | 1.5 | 1.5 |
| Test | | | | | | |
| Hs | 70 | 71 | 71 | 70 | 70 | 71 |
| VES | | | | | | |
| E* (MPa) | 7.9 | 7.7 | 7.5 | 8.5 | 7.9 | 6.3 |
| tan δ (%) | 0.23 | 0.18 | 0.13 | 0.26 | 0.25 | 0.12 |
| Tensile | | | | | | |
| TB (MPa) | 19 | 18 | 16 | 20 | 20 | 14 |
| EB (%) | 420 | 470 | 410 | 400 | 410 | 440 |
| Tear propagation (N/m) | 61 | 69 | 67 | 57 | 59 | 65 |
| Lightweight Tire/g | 52 | 180 | 340 | standard | 9 | 355 |
| Steering Stability | 6 | 6 | 6 | 6 | 6 | 5 |

In Example 1, tensile strength at break (TB), elongation at break (EB) and the results of the tear propagation test were approximately the same as those in Comparative Example 1 but a lightweight tire was obtained. The tanδ value was decreased and rolling resistance was reduced. Although TB slightly decreased, Example 3 was recognized as being largely effective for obtaining a lightweight tire. The tanδ value was significantly decreased and rolling resistance was reduced. On the other hand, Comparative Example 2 was not recognized as being largely effective for obtaining a lightweight tire. The tanδ value was not significantly decreased and rolling resistance was not reduced. Also, in Comparative Example 3, the E* value was decreased and steering stability was poor.

Usually, the specific gravity of polyethylene is at most 1 (0.94). On the other hand, the specific gravity of the rubber composition for a tire is at least 1. By compounding polyethylene powder having a low specific gravity to the rubber composition as in the present invention, rolling resistance is reduced and a lightweight tire can be obtained.

According to the present invention, a lightweight tire can be obtained without decreasing durability and reduced rolling resistance and improved steering stability of the tire can be achieved.

What is claimed is:

1. A pneumatic tire having a base tread comprising a rubber composition, comprising:
   20 to 120 parts by weight of an inorganic filler, and
   5 to 70 parts by weight of polyethylene powder,
   based on 100 parts by weight of diene rubber;
   said rubber composition being prepared by kneading at 140° C. at most.

2. The pneumatic tire having a base tread formed from the rubber composition of claim 1, wherein the particle size of said polyethylene powder is at most 500 μm.

3. A pneumatic tire having a base tread and a cap tread, wherein the base tread comprises a rubber composition, comprising:
   20 to 120 parts by weight of an inorganic filler, and
   5 to 70 parts by weight of polyethylene powder,
   based on 100 parts by weight of diene rubber;
   said rubber composition being prepared by kneading at 140° C. at most.

4. The pneumatic tire having a base tread formed from the rubber composition of claim 3, wherein the particle size of said polyethylene powder is at most 500 μm.

5. The pneumatic tire of claim 1, wherein the inorganic filler is present in an amount of 30 to 100 parts by weight, and the polyethylene powder is present in an amount of 5 to 60 parts by weight, based on 100 parts by weight of diene rubber.

6. The pneumatic tire of claim 3, wherein the inorganic filler is present in an amount of 30 to 100 parts by weight, and the polyethylene powder is present in an amount of 5 to 60 parts by weight, based on 100 parts by weight of diene rubber.

7. The pneumatic tire of claim 1, wherein the inorganic filler is present in an amount of 35 to 85 parts by weight, and the polyethylene powder is present in an amount of 10 to 55 parts by weight, based on 100 parts by weight of diene rubber.

8. The pneumatic tire of claim 3, wherein the inorganic filler is present in an amount of 35 to 85 parts by weight, and the polyethylene powder is present in an amount of 10 to 55 parts by weight, based on 100 parts by weight of diene rubber.

9. The pneumatic tire according to claim 1, wherein the rubber composition is prepared by kneading at 110 to 140° C.

10. The pneumatic tire according to claim 3, wherein the rubber composition is prepared by kneading at 110 to 140° C.

* * * * *